(12) United States Patent
Demit et al.

(10) Patent No.: US 8,171,609 B2
(45) Date of Patent: May 8, 2012

(54) WORKSTATION WITH A MULTIPLE-FACE PARTS SUPPORT, AND A METHOD OF CONTROLLING SUCH A WORKSTATION

(75) Inventors: Daniel Demit, Courbevoie (FR); Fabrice LeGeleux, Meriel (FR); François Malatier, Taverny (FR)

(73) Assignee: ABB France, Rueil-Malmaison (FR)

( * ) Notice: Subject to any disclaimer, the term of this patent is extended or adjusted under 35 U.S.C. 154(b) by 369 days.

(21) Appl. No.: 12/441,104

(22) PCT Filed: Sep. 13, 2007

(86) PCT No.: PCT/FR2007/001479
§ 371 (c)(1),
(2), (4) Date: Mar. 12, 2009

(87) PCT Pub. No.: WO2008/031945
PCT Pub. Date: Mar. 20, 2008

(65) Prior Publication Data
US 2010/0038837 A1 Feb. 18, 2010

(30) Foreign Application Priority Data
Sep. 14, 2006 (FR) ...................................... 06 08033

(51) Int. Cl.
*B25B 27/14* (2006.01)
*B23Q 7/04* (2006.01)

(52) U.S. Cl. .......................................... 29/281.4; 29/559
(58) Field of Classification Search ................. 29/281.1, 29/281.4, 559, 791, 795
See application file for complete search history.

(56) References Cited

U.S. PATENT DOCUMENTS

| | | | |
|---|---|---|---|
| 5,103,551 A * | 4/1992 | Tamura et al. | 29/559 |
| 5,479,698 A | 1/1996 | Angel | |
| 2008/0168639 A1* | 7/2008 | Otake et al. | 29/56.6 |

FOREIGN PATENT DOCUMENTS
DE 10 2004021389 11/2005
* cited by examiner

*Primary Examiner* — David B Thomas
(74) *Attorney, Agent, or Firm* — Muncy, Geissler, Olds & Lowe, PLLC

(57) ABSTRACT

The invention relates to a robotic workstation (1), comprising at least one multiple-axis parts-handling robot (7) having an arm (9) with a free end that is provided with a parts support (10), and first and second operational units (5, 6) for co-operating functionally with the support, and wherein the support comprises a body (11) provided with locations (14) for receiving parts, said locations being arranged so that each of them is accessible simultaneously by one of the operational units. The invention also provides a method of controlling the station.

13 Claims, 1 Drawing Sheet

WORKSTATION WITH A MULTIPLE-FACE PARTS SUPPORT, AND A METHOD OF CONTROLLING SUCH A WORKSTATION

BACKGROUND OF THE INVENTION

1. Field of the Invention

The present invention relates to a workstation and to a method of controlling such a workstation. A workstation of this type can be used in fabricating bodywork parts for motor vehicles.

2. Brief Discussion of the Related Art

A workstation generally comprises a base having fastened thereto at least a parts-handling robot and an operational unit for performing at least one operation on the parts, such as an assembly, welding, crimping, or other operation. The handling robot is generally controlled so as to load the parts onto a support that is secured to the base and that is arranged to hold each part in a predetermined position so as to occupy a geometrical position reference for the operation that is performed by the operational unit. Once the operation has been completed, the handling robot takes hold of the part in order to place it outside the workstation.

The users of such workstations generally need to maximize their profitability, i.e. to make maximum use of the workstations and the elements making them up, and they also have flexibility requirements for workstations to be easily be adapted to different types of part, different rates of throughput, and to modifications in the manufacturing process, it nevertheless being understood that this need for flexibility must not be satisfied to the detriment of profitability. Furthermore, it is found necessary to make workstations more and more compact so as to make best use of the space available without thereby sacrificing flexibility.

SUMMARY OF THE INVENTION

An object of the invention is to propose a workstation that enables the above-mentioned needs to be satisfied, at least in part.

To this end, the invention provides a robotic workstation, comprising at least one multiple-axis parts-handling robot having an arm with a free end that is provided with a parts support, and first and second operational units for co-operating functionally with the support, the support comprising a body provided with locations for receiving parts, said locations being arranged so that each of them is accessible simultaneously by one of the operational units.

Thus, parts are positioned in the workstation by the handling robot, and the operational units can operate simultaneously on the support as positioned by the handling robot. It is then possible to perform operations concurrently and to compensate for variations in dimensions between series of parts by modifying the position and the inclination of the support in the workstation.

Preferably, the body of the support has a plurality of faces, each defining a location for receiving parts and, advantageously, the locations are arranged on two opposite faces of the body, the body being mounted on the free end of the arm of the handling robot to pivot about an axis extending symmetrically relative to the faces.

This embodiment is particularly advantageous since it limits any risk of interference between the operational units that are co-operating simultaneously with the support.

Also preferably, the station comprises at least as many operational units suitable for co-operating functionally with the support as the body of the support has faces provided with locations for receiving parts.

This makes it possible to make full use of the options made available by the arrangement of a plurality of parts locations on the support.

Advantageously, one of the operational units is arranged to co-operate operationally with a plurality of faces of the support in succession.

The invention also provides a method of controlling a workstation comprising at least one handling robot having an arm with a free end provided with a support provided with at least first and second parts-receiving locations, a loading robot for loading parts into the locations, and an operational unit, the locations being disposed so that each of them is accessible simultaneously by the loading robot and the operational unit, the method comprising the steps of:

controlling the loading robot to load a part in the first location;

controlling the handling robot to present the part received in the first location to the second operational unit; and controlling the second operational unit to perform an operation on the part as presented thereto and controlling the loading robot to load a part in the second location while the operation is being performed by the operational unit.

Parts are thus loaded concurrently with operations being performed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
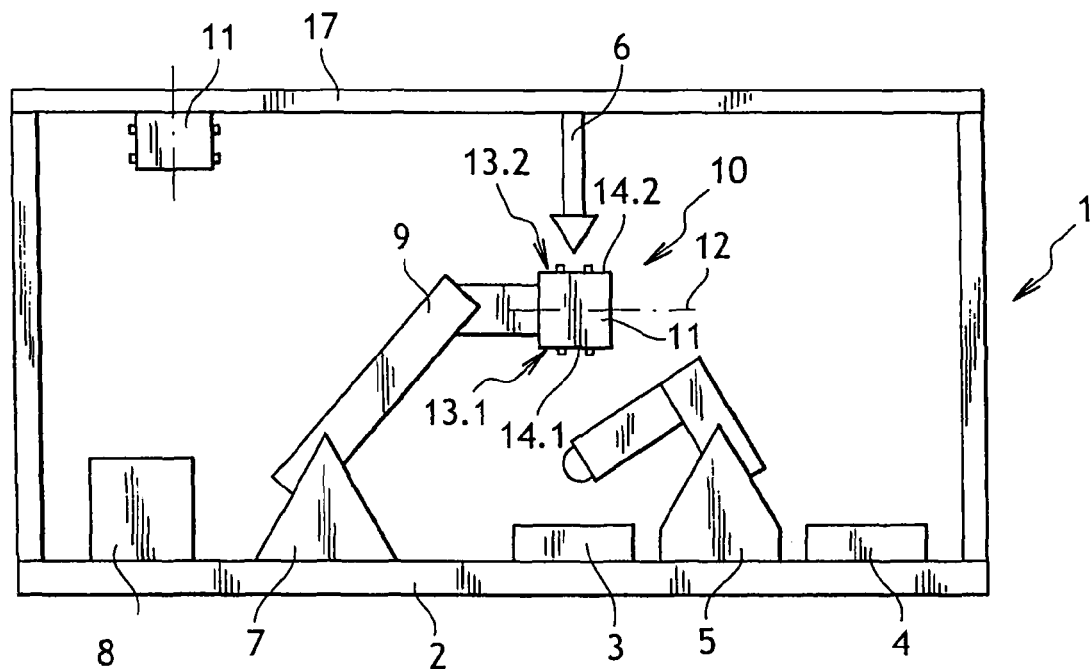
FIG. 1 is a diagrammatic elevation view of a workstation in accordance with a first embodiment of the invention.

With reference to FIG. 1, the workstation in accordance with a first embodiment is for performing final welding of a part comprising two preassembled portions.

The workstation, given overall reference 1, comprises a base 2 having mounted thereon a parts-delivery conveyor 3, a parts-removal conveyor 4, a first operational unit 5, a second operational unit 6, and a multiple-axis handling robot 7. The conveyors 3 and 4, the operational units 5 and 6, and the handling robot 7 are connected to a control unit 8 comprising a computer system executing a program arranged to cause the above-mentioned elements constituting the workstation 1 to operate in coordinated manner.

The base 2 comprises, in conventional manner, a soleplate that rests on the ground and that carries a frame and that is surrounded by a protective perimeter that is not visible in FIG. 1 (wire mesh, walls, . . . ). The soleplate enables the workstation 1 to be fastened to the ground and it includes passages for passing electric cables for powering and controlling the components of the workstation 1. The soleplate may also be arranged to form a portion of a modular production line, e.g. by incorporating means for connecting it functionally with an adjacent workstation. By way of example, the functional connection means comprise mechanical means connecting the workstation together, means for interconnecting power supply and/or control cables of the workstations, . . . .

Each of the conveyors 3 and 4 is constituted by an endless transport loop mounted on the base 2 in such a manner that each conveyor 3, 4 has one end close to the first operational unit 5 and an opposite end close to an edge of the workstation 1. Outside the workstation, parts are loaded onto the delivery conveyor 3 and removed from the removal conveyor 4, e.g. by means of an operator or a robot.

The first operational unit 5 is constituted by a loading/unloading robot controlled to take parts for working on from the conveyor 3 and to place parts that have been worked on onto the conveyor 4.

The second operational unit 6 is a laser welding head mounted on the frame of the base 2 substantially over the loading/unloading robot 5. The welding head 6 possesses freedom to move angularly and it can be moved angularly within this freedom.

The handling robot 7 has an arm 9 with one end connected to the soleplate of the base 2 and an opposite end that is free and provided with a parts support 10. The support 10 comprises a body 11, here in the form of a drum, that is mounted on the free end of the arm 9 to pivot about an axis 12, and that possesses two faces 13.1 and 13.2 that are opposite from each other and parallel to the axis 12. Members are fastened on each of the faces 13.1 and 13.2 for the purpose of holding and positioning a part so as to define a location 14.1, 14.2 for a part.

In operation, when parts are present on the conveyor 3, the handling robot 7 is controlled to place the support 10 close to the loading/unloading robot 5 and the welding head 6 in such a manner that each of the locations 14.1 and 14.2 is accessible by the loading/unloading robot 5 and by the welding head 6.

The control unit 8 controls the loading/unloading robot 5 to take hold of a part on the conveyor 3 and position it in the location 14.1 presented thereto by the handling robot 7. The handling robot 7 locks the part in place and then pivots the support 10 so as to present the part to the welding head 6, while presenting the location 14.2 to the loading/unloading robot 5.

The welding head 6 then begins the welding operation, and the handling robot 7 moves the support 10 together with the part so that the laser beam reaches the portions for welding.

During the welding operation, the control unit 8 controls the loading/unloading robot 5 to take hold of a part on the conveyor 3 and place it in the location 14.2 presented thereto by the handling robot 7. Since the handling robot 7 is moving the support 10 for welding purposes, the loading/unloading robot 5 is controlled in coordination with the handling robot 7 so as to load the part into the location 14.2 while tracking the movements of the support 10.

At the end of welding, the control unit 8 causes the support 10 to pivot so as to bring the location 14.2 in front of the welding head 6 and bring the location 14.1 in front of the loading/unloading robot 5.

The welding head 6 then begins the welding operation while the handling robot 7 moves the support 10 together with the part so that the laser beam reaches the portions for welding.

During the welding operation, the control unit 8 controls the loading/unloading robot 5 to take hold of the part in the location 14.1 that is presented thereto by the handling robot 7 and place it on the conveyor 4, and then to take hold of a part on the conveyor 3 and place it in the location 14.1. Since the handling robot 7 is moving the support 10 for welding purposes, the loading/unloading robot 5 is controlled in coordination with the handling robot 7 to unload the welded part from the location 14.1 and to load a part for welding in the location 14.1 while tracking the movements of the support 10.

The cycle then continues as above.

It should be observed that the station 10 possesses a magazine 17 of supports 11 that is capable of receiving a plurality of supports 11 that are adapted to different parts, and the arm 9 of the handling robot is arranged to be able to connect with a support 11 and to disconnect therefrom so that the handling robot 7 can change the support 11 as a function of the parts to be assembled.

Figure 2:
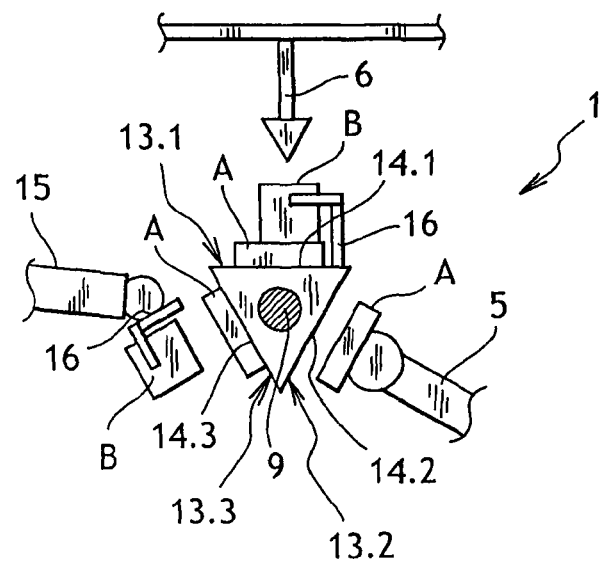
FIG. 2 is a fragmentary diagrammatic view of a workstation in accordance with a second embodiment of the invention.

In the description below of a second embodiment as shown in FIG. 2, elements that are identical or analogous to those described above are given the same numerical references.

The workstation 1 of the second embodiment is generally identical to that of the first embodiment, i.e. it comprises a loading/unloading robot 5, a welding head 6, and a handling robot 7, of which only the arm 9 is shown (in cross-section in FIG. 2).

Nevertheless, the workstation 1 is now arranged to weld together a part of a first type A and a part of a second type B, which parts are brought separately to the workstation 1 by transport means that are themselves known, such as conveyors or robots.

The loading/unloading robot 5 is controlled to load parts of the first type A on the support 10 and to unload from the support 10 welded assemblies as formed by assembling a part of the first type A with a part of the second type B.

The workstation 1 has an additional loading robot 15 controlled to load on the support 10 parts of the second type that are secured to additional support frames or to intermediate supports 16.

The support 10 has three faces 13.1, 13.2, and 13.3 having respective parts-receiving locations 14.1, 14.2, and 14.3 formed thereon, with each of these locations including means for holding and positioning parts of the first type A and means for holding and positioning intermediate supports 16.

In operation, the handling robot 7 is controlled to place the support 10 in the vicinity of the loading/unloading robot 5, in the vicinity of the loading robot 15, and in the vicinity of the welding head 6 so that each of the locations 14.1, 14.2, and 14.3 is made accessible to the loading/unloading robot 5, to the loading robot 15, and to the welding head 6.

At the beginning of the cycle, the control unit 8 controls the loading/unloading robot 5 to take hold of a part of the first type A and position it in the location 14.1 presented thereto by the handling robot 7. The handling robot 7 locks the part in place and then causes the support 10 to pivot so as to present the location 14.1 to the loading robot 15, the location 14.2 to the welding head 6, and the location 14.3 to the loading/unloading robot 5.

The control unit 8 then controls the loading/unloading robot 5 to take hold of a part of the first type A and position it in the location 14.3 that is presented thereto by the handling robot 7, and it controls the loading robot 15 to take hold of a part of the second type B together with its intermediate support 16, and position them in the location 14.1 presented thereto by the handling robot 7. The handling robot 7 then locks the part of the first type A in the location 14.3 and locks the intermediate support 16 in the location 14.1, after which it causes the support 10 to pivot so as to present the location 14.3 to the loading robot 15, the location 14.1 to the welding head, and the location 14.2 to the loading/unloading robot 5.

The welding head 6 then begins the operation of welding together the parts received in the location 14.1 and the handling robot 7 moves the support 10 and the parts it carries so that the laser beam reaches the parts to be welded.

During the welding operation, the control unit 8 controls the loading/unloading robot 5 to take hold of a part of the first type A and position it in the location 14.2 presented thereto by the handling robot 7, and it controls the loading robot 15 to take hold of a part of the second type B together with its intermediate support 16, and position them in the location 14.3 presented thereto the handling robot 7. Since the handling robot 7 is moving the support 10 for welding purposes, the loading/unloading robot 5 and the loading robot 15 are controlled in coordination with the handling robot 7 so as to load the parts in the locations 14.2 and 14.3 while tracking the movements of the support 10. The handling robot 7 locks the parts and the intermediate support 16 that is positioning the parts geometrically relative to each other.

At the end of the welding operation, the handling robot 7 causes the support 10 to pivot so as to present the location 14.2 to the loading robot 15, the location 14.3 to the welding head, and the location 14.1 to the loading/unloading robot 5.

The welding head 6 then begins the operation of welding together the parts received in the location 14.3 and the handling robot 7 moves the support 10 and the parts it carries so that the laser beam reaches the parts to be welded together.

During the welding operation, the control unit 8 controls the loading/unloading robot 5 to take hold of the welded-together assembly in the location 14.1 presented thereto by the handling robot 7, to place it on the transport means, and to take hold of a part of the first type and position it in the location 14.1. Simultaneously, the control unit 8 controls the loading robot 15 so that it takes hold of a part of the second type together with its intermediate support 16 and positions them in the location 14.2 presented thereto by the handling robot 7. Since the handling robot 7 is moving the support 10 for welding purposes, the loading/unloading robot 5 and the loading robot 15 are controlled in coordination with the handling robot 7 to track the movements of the support 10 while they are performing their loading and unloading operations. The handling robot 7 locks the parts and the intermediate support in place.

At the end of the welding operation, the handling robot 7 then causes the support 10 to pivot so as to present the location 14.1 to the loading robot 15, the location 14.2 to the welding head, and the location 14.3 to the loading/unloading robot 5.

The cycle then continues as described above.

Naturally, the invention is not limited to the embodiments described, but covers any variant embodiment coming within the ambit of the invention as defined by the claims.

In particular, provision can be made for the handling robot to place the support 10 so that it presses against reference studs secured to the base of the workstation 1 during the operations performed by the other robots (assuming that there is no need for the support to be moved while these operations are being performed).

The functions of the conveyors 3 and 4 may be performed by the loading/unloading robot 5 or by other robots.

The operational units may be stationary or moving work heads (for welding, adhesive-bonding, grinding, riveting, . . . ), or they may be working robots. Thus, the welding head 6 may be stationary or movable.

In a variant of the second embodiment, the support may have four faces and the workstation may have either a second operational working unit or a robot for unloading the welded assembly from the support 10, the robot 5 then serving to load parts of the first type on the support 10.

In a variant, there is no need to use a robot 15, the robot 5 then serving to unload assembled-together parts A+B and the support 16, to load the part A, and then to load the part B and the support 16.

The axis 12 may extend symmetrically relative to the faces 13.1 and 13.2 without being parallel thereto, for example when the support is in the form of a pyramid, in particular a tetrahedron.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein the body of the support has a plurality of faces, each defining a location for receiving parts.

2. The workstation according to claim 1, wherein the locations are arranged on two opposite faces of the body, the body being mounted on the free end of the arm of the handling robot to pivot about an axis extending symmetrically relative to the faces.

3. The workstation according to claim 1, including at least as many operational units suitable for co-operating functionally with the support as the body of the support has faces provided with locations for receiving parts.

4. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein the handling robot includes a support changer.

5. The workstation according to claim 4, wherein as least one of the operational units is arranged to co-operate operationally with at least two faces of the support in succession.

6. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein the locations are provided with means for geometrically positioning parts.

7. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein at least one of the locations is provided with means for retaining an optional holding frame for holding a part for assembling to a part that is positioned in the location.

8. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein the first operational unit is a loading robot for loading parts on the support.

9. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein the first operational unit is an unloading robot for unloading parts from the support.

10. A robotic workstation comprising at least one multiple-axis parts-handling robot having an arm with a free end that is provided with a parts support, and first and second operational units for co-operating functionally with the support, and wherein the support comprises a body provided with locations for receiving parts, said locations being arranged so that each of them is accessible simultaneously by one of the operational units, wherein the second operational unit is a substantially stationary work head, the station including a control unit arranged to coordinate movements of the handling robot and of the first operational unit.

11. The workstation according to claim 10, wherein the handling robot and at least one of the operational units are connected to a common control unit.

12. A method of controlling a workstation comprising at least one handling robot having an arm with a free end provided with a support provided with at least first and second parts-receiving locations, a loading robot for loading parts into the locations, and an operational unit, the locations being disposed so that each of them is accessible simultaneously by the loading robot and the operational unit, the method comprising the steps of:
controlling the loading robot to load a part in the first location;
controlling the handling robot to present the part received in the first location to the operational unit; and
controlling the operational unit to perform an operation on the part as presented thereto and controlling the loading robot to load a part in the second location while the operation is being performed by the operational unit.

13. The method according to claim 12, wherein during the operation, the handling robot moves the support and the loading robot is controlled in coordination with the handling robot to load the part into the second location.

* * * * *